United States Patent Office 3,563,830
Patented Feb. 16, 1971

3,563,830
PROCESS FOR PREPARING SEAMING TAPE
Charles D. Burgess, Macon, Ga., assignor, by mesne assignments, to Giffen-Burgess Corporation, a corporation of Delaware
No Drawing. Application Dec. 6, 1966, Ser. No. 599,414, now Patent No. 3,400,038, dated Sept. 3, 1968, which is a continuation-in-part of application Ser. No. 535,333, Mar. 18, 1966. Divided and this application June 26, 1968, Ser. No. 770,874
Int. Cl. B32b 7/14
U.S. Cl. 156—291
15 Claims

ABSTRACT OF THE DISCLOSURE

A process is described for the face seaming of strips of carpeting, utilizing a seaming tape comprising a hot-melt adhesive conjointly with a joining web having open areas, and a barrier web which has not. It is essential that at least 0.12 oz. of the adhesive per foot of carpeting to be seamed be provided to accomplish lateral flow of the molten adhesive and to fill the interstices of the joining web and in the backside of the carpeting to be joined. The components of the tape ready for use, can be attached to each other most conveniently by utilizing the adhesive properties of the hot adhesive layer.

---

This application is a division of application Serial No. 599,414 filed Dec. 6, 1966, now patent 3,400,038, granted Sept. 3, 1968, and which in turn is a continuation-in-part of application for United States Letters Patent, Serial No. 535,333, filed Mar. 18, 1966 now patent 3,415,703, granted Dec. 10, 1968.

This invention relates to a process for carpet-seaming, more particularly face seaming of carpets, seaming tape, and a process for making the seaming tape.

In the laying or fitting of wall-to-wall carpeting, and in carpet repair, seaming is employed to join the adjacent abutting edges of strips of carpeting. Depending on the nature and shape of the carpeting, the face seam or back seam techniques are employed. According to the face seam technique the carpet strips to be joined are laid onto the floor face up, and the two strips to be joined are fastened to the floor by temporary or "stay" tacks at locations somewhat away from the adjoining edges to be seamed. The edges of the carpet to be joined are bent upwardly, a carpet seaming tape such as of fiberglass, cotton, jute, muslin, or blends thereof, is placed onto the floor below the carpet in a relation overlapping both strips to be joined, a latex, epoxy, or other adhesive solution is applied onto the upward facing surface of the tape, sometimes also onto the upward bent edges of the carpet backing, then the carpet edges are lowered onto the adhesive-coated tape, pressure is applied and maintained, such as by tacking the carpet to the tape and the floor, until the solvent evaporates. The latex adhesive bonds the tape to the carpet backing and an adhesive seam is created. Finally the stay tacks are removed. Often the seaming tape is provided with a barrier backing, such as paper, to prevent the adhesive from soiling subadjacent surfaces.

In employing the back seam technique the carpet segments to be joined are laid on the floor face down, stay tacks are applied, a latex, epoxy, or other adhesive solution is applied onto the carpet backing in the zones of the abutting edges to be joined, onto the tape to be applied, or both, and the tape is pressed against the carpet backing on both segments to be joined. After the solvent evaporates the adhesive bond is complete, The stay tacks and the pressure are removed, and the joined carpet segments are reversed and installed. The above-described prior art techniques have several drawbacks. A serious drawback is presented by the fact that the solvent for the latex has to evaporate, which requires considerable waiting time before the joined carpet segments can be handled. In the case of epoxy adhesives the components have to be mixed before use, and curing of the adhesive requires extended periods of time. With the back seam technique in the case of latex, four to six hours are required for taping and evaporation. When using the more preferred and considerably more often used face seam technique with latex, a period of 6–10 hours waiting time is required, because the dense carpet backing and the carpeting itself considerably retard evaporation of the solvent for the latex. The long waiting time prevents completion of the insulation in the same work shift.

Another drawback of the prior art techniques is that the highly fluid latex solution tends to bleed through to the front of the carpet between the abutting edges, creating unsightly stains and emphasizing the location of the seam which would be preferably concealed to present the appearance of continuous, seamless carpeting. When the seam is made with the prior art latex bonding technique, the seam opens up due to the elasticity of the latex when the seamed carpet is stretched for wall-to-wall installation under a stretch of about 125 p.s.i. and the seam separates under a stretch of 200–300 p.s.i.

In the adhesive-bonding of strips of carpeting, latex solutions are employed presently in about 90% of the cases. According to another known commercial technique the abutting edges of the strips of carpeting to be joined are sewn together and a layer of a latex solution is brushed over the sewn-together surfaces to hold the thread in place.

Latex solutions cannot be stored at cold temperatures, because the solutions freeze and become inoperative for carpet seaming purposes. The solutions are commercially provided in cans which are increasingly difficult to reseal after their contents have been used a number of times, resulting in waste, due to substantial evaporation of the solvent.

Other methods of joining abutting carpet edges have been suggested in the prior art, but they have not found any commercial use due to their inadequate operation. These processes were proposed only for back seaming. In United States Letters Patent 3,219,508 to Studer et al., a webbing is suggested for joining adjacent strips of carpeting, wherein the filaments from which the webbing is prepared are individually sheathed or coated with a vinyl resin. The backing of the carpet strips to be joined, has to be provided also with a coating of vinyl resin. The use of such hot-melt adhesive-sheathed seaming tapes is suggested only for back seaming.

In accordance with the object of the present invention a method for carpet seaming, a seaming tape, and a process for preparing the tape are provided, all of which overcome the disadvantages and drawbacks of prior art materials and techniques.

To make a face seam a barrier web, a joining web formed of discrete elements spaced from each other to provide interstices between the elements, and a slab of hot-melt adhesive (HMA) are placed in juxtaposed relationship substantially parallel to the back side of the strips of carpeting to be joined and opposed to an area of the back side adjacent to the abutting edge zones to be joined, the joining web and the slab being sandwiched between the barrier web and the strips of carpeting. The abutting edge zones are separated, the slab is melted by the application of heat thereto from between the separated abutting edge zones, the separate edge zones of the carpet are abutted over and sufficient pressure is applied to the face of the strips of carpeting in the edge zones to cause the molten adhesive to flow and wet at least partially substantially the backing of the carpet in the edge zones. The HMA slab should weigh at least 0.12 oz. per foot of carpeting to be seamed, providing a sufficient amount of HMA as will flow in the molten state in a lateral direction and will also substantially fill the interstices between the discrete elements of the joining web.

The slab of HMA can be alternately located in accordance with the present invention between the back side of the carpet in the edge zones and the joining web, between the joining web and the barrier web, or the joining web can already be partially or totally embedded within the slab.

The term "hot-melt adhesive" (HMA) refers to bonding agents which achieve a solid state and resulting strength by cooling, as contrasted with other adhesives which achieve the solid state through evaporation, through removal of solvents, or by cross-linking. When cold, HMA are thermoplastic solid materials. Application of heat brings the HMA to a liquid, tacky state, and after removal of the heat the adhesives set by simple cooling. HMA provide almost instantaneous bonding, together with a high degree of wetting. Typical HMA are based on coumarone-indene resins, rosin and its derivatives; mineral, vegetable, and petroleum waxes; alkyds; terpene resins; heat-stable phenol-formaldehyde resins. All of the foregoing are preferably modified with higher molecular weight polymers, such as ethyl cellulose, polyvinyl acetate and its derivatives, butyl methacrylates, polyethylene, polystyrene and styrene copolymers, and polyisobutylene. Commercial examples of such polymers include olefin polymer or copolymer-based adhesives sold by the Borden Chemical Co. under the trade designations HA-5423, HA-5428, and HM-109-34; modified polyethylene base adhesives sold by the Eastman Chemical Co. under the trade designations Epeline C17, Eastobond L-8080/91 and L-8080/38; and by the H. B. Fuller Co. under the trade designations HM 131 R, HM 212 R, and HM 065 R.

The HMA is applied at a weight of at least 0.12 oz. per foot of seam, preferably at a weight of 0.4–0.5 oz. per foot. While the width of the layer is not critical as long as the minimum weight is employed, most conveniently the width of the HMA slab should be at least ½" or more to avoid any difficulties necessitating accurate placement of overly narrow tapes.

Natural asphalts and vegetable and coal-tar-pitches can also be used as base materials in HMA. Polyethylene, polyvinyl acetate, polyamide derived from dimerized fatty acids and diamines, are also known as useful HMA by themselves. HMA are compounded by a great number of manufacturers and most all of these materials are known or believed to be suitable for use in accordance with the present invention.

The HMA materials employed in accordance with the present invention do not have to be completely inert to solvents customarily used in rug cleaning, because such solvents are not likely to create problems, except possibly some minor ones and only in such rare instances when the solvents are used in such abundance that appreciable quantities would seep through the body of the carpet. The particular HMA composition most suitable for particular carpet backing materials and for particular seaming tapes can be selected by routine experimentation. For most applications in accordance with the present invention a HMA can be used which can be rendered to form a sufficiently tacky melt at about 200–400° F., and which is sufficiently hardened at about 120° F. to enable a bond made therewith to withstand the stresses encountered by the carpet seam when stretched at the time of wall-to-wall installation and during normal use of the seamed carpet at customary ambient temperatures.

The HMA used in accordance with the invention, preferably contains a plasticizer to permit handling and storage of the adhesive-applied tapes manufactured for later use in the form of rolls.

The joining web formed of discrete elements, can be a woven tape of loose structure wherein the woven yarn constitutes the discrete elements, or a loosely constituted fibrous webbing such as the sequentially disposed strands of fibers of U.S. Letters Pat. 2,727,295 to Wright.

The joining web can be made from practically any fiber-like material capable of withstanding temperatures it may be exposed to during the melting of the HMA, and which material does not have substantial elasticity or yield, and is chemically insubstantially affected by the molten HMA. Such materials include glass fiber, sisal, jute, linen, etc., glass fibers being preferred for reasons of tenacity. The discrete elements constituting the joining web provide interstitial spaces between the discrete elements to allow penetration of the HMA through the joining web irrespective of whether the HMA slab is disposed between the joining web and the barrier web, or between the joining web and the back side of the carpet strips to be joined. The interstices or voids in the joining web permit penetration of the HMA through the joining web and thereby provide the means for anchoring the HMA to the joining web.

The barrier web serves principally to provide a barrier against the flow of molten HMA in a direction away from the strips of carpeting to be joined, and thereby prevent the loss of HMA as well as soiling or staining of surfaces underlying the carpet. Since the amount of HMA used is a critical feature of the present invention, loss of HMA can result in insufficient bond strength as well as the uneconomical measure of having to supply initially more HMA than would be necessary for creation of the bond, to compensate for amounts lost. The barrier web can be most conveniently made from paper which may also be creped, such as in United States Letters Patent 2,727,295 to Wright but also can be made of other materials capable of providing a sufficient barrier against the penetration of HMA even at temperatures to which the HMA is heated for bringing it into the condition of a melt. For example, the barrier web can be made, in addition to paper, from aluminum or other metal foils, densely woven textiles, solid films of sufficient temperature resistance, such as cellophane, etc. The barrier web is preferably wider than the joining web or the HMA slab, to provide a barrier against the loss of HMA which flows in a lateral direction during seaming.

Composite seaming tape assemblies in accordance with the present invention can be prepared by layering a joining web over a barrier web together with a slab or strip of HMA. The HMA can be rolled or extruded either at the time of layering the joining web and the barrier web, or an already rolled or extruded slab or strip of HMA can be used either between the joining web and the barrier web or on top of the joining web. In an alternative embodiment, the joining web can be embedded in the slab of HMA by pouring, extrusion, rolling, or other convenient means. In any event, the thickness of the HMA slab, whether it contains the joining web or not, should be at least about $\frac{1}{16}$", with at least 0.2 oz. HMA, preferably at least 0.4 oz. HMA per foot of seam, to provide enough HMA for creation of the bond in accordance with the invention.

The seaming tape of the invention can be used for back seaming; however, its predominant mode of application is in face seaming which is the seaming technique used in an overwhelming majority of cases where the joining of strips of carpeting for wall-to-wall installations is carried out. The tape of the invention can be assembled on the spot where seaming is to be carried out, or a previously manufactured and assembled tape can be used. In the latter case the barrier web, joining web, and HMA slab layers of the tape can be provided in a roll in which the various elements of the sandwiched tape structure can be secured together by any convenient means such as stitching, stapling, clamping, or by utilizing the HMA strip which is rendered tacky to bond the various webs together.

In carrying out face seaming, the composite tape sandwich is laid on the floor to be covered by the carpet, or if a carpet padding layer is to be employed, onto the padding, with the barrier web of the composite tape contacting the padding or the floor, as the case may be. The strips of carpeting to be joined are placed over the tape with the abutting edge zones overlying the tape. At this point of the process, preferably a few stay tacks are driven through the carpet, or some weights, such as sandbags are placed onto the carpet strips to be joined to prevent the carpet strips from shifting from their relative position during manipulation. The abutting edge zones of the carpet strips are bent upwards, the HMA of the tape is melted, such as by inserting a sadiron or similar implement between the upward bent abutting edge zones of the carpet, and contacting the tape with the iron. The sadiron melts the HMA, as it is slowly pulled along the tape between the upward bent edges of the carpeting. Following the path of the sadiron along the tape, the upward bent carpet edge zones are progressively pressed into the molten HMA. Pressure has to be maintained only for a very short period, because the HMA cools at a sufficiently rapid rate to create a substantially immediate bond between the backing of the carpet strips to be joined and the joining web, therefore, the means by which the pressure is applied, such as manual pressure by the operator, can move along the seam to be created, at the same speed as the sadiron is being moved. Since the seam is completely finished substantially immediately after the pressure from the abutting edge zones has been removed, the process can be considered as a practically instantaneous one, especially when viewed in comparison with the 6–10 hours drying time required with prior-art solvent-applied adhesives.

Seams made in accordance with the invention have considerably better appearance than those made in accordance with the prior art, because the carpet edges seamed in accordance with the present invention are less apparent and, therefore, make the wall-to-wall carpeting appear more as being made of a single piece of carpeting. Seams made in accordance with prior art solution-type adhesives open up during the long drying, because of the shrinking of the adhesives, and if the edges to be joined are not tacked or weighted down sufficiently, they tend to curl upwardly before the adhesive begins to become tacky. Seams made in accordance with the present invention do not open up, because the HMA retains its size and shape acquired upon cooling and no subsequent distortion occurs in the appearance of the seam. In the case of most solvent-applied adhesives, especially in the case of latex, the dried adhesive layers possess considerable elasticity and yield to stresses; therefore, the bonded seam can stretch apart in use. In the seams made in accordance with the present invention the bond is extremely tenacious and will not, even temporarily, tend to pull apart.

Prior art seaming techniques necessitate the use of stay tacks which are left in the carpet for prolonged periods of time during the drying of the solvent-applied adhesive. Stay tacks leave indentations in the carpet pile and since they are applied close to and along the seam, the indentations further emphasize the location of the seam. This drawback is completely eliminated by the described method.

In a preferred embodiment of the invention the tape sandwich is prepared by rolling or extruding molten HMA in a layer of at least $\frac{1}{16}$" thickness onto a kraft paper barrier web and covering the extruded HMA layer, most preferably while still hot, with the joining web and using this tape in the form of pre-manufactured rolls for carpet seaming. As the sadiron contacts the tape during the seaming operation the joining web is pressed further into the HMA layer which, in turn, oozes upward through the interstices of the joining web until the majority of the HMA becomes disposed above the joining web. This also provides a visual indication to the operator that the HMA has been sufficiently melted and allows him to thereby control the rate of progress of the sadiron along the line to be seamed.

In a most preferred mode of carrying out the process a very flat, thin sadiron is used allowing contact between the underside of the abutting strips of carpeting to be joined adjacent to the abutting edges and the top of the thin sadiron, whereby the underside of the strips of carpeting becomes also heated, thereby maintaining the HMA in fluid condition for a longer period, which results in better and more thorough penetration of the carpet backing interstices by the HMA. This renders the bond even stronger and more tenacious. Since the upward and outward turned carpet edge zones are abutted, i.e., folded downward and inward again over the top of the thin sadiron, there is less exposure of the molten HMA, the carpet edge zones muffle, insulate the melt, resulting in a retention of the heat within the seam structure, rapid cooling is prevented and more thorough penetration of the carpet backing and a resultant stronger bond are created. Since setting up of the molten HMA is delayed, the carpet edge zones do not have to be immediately repressed into the melt, thereby a longer closing time is provided, with resultant greater flexibility of operation.

EXAMPLE 1

A 5" wide strip of a carpeting is cut into two halves across the width. The carpeting was made and sold by the Bigelow-Sanford Corp. under the trade designation Gropoint, well known and recognized as a standard throughout the industry for commercial carpeting applications. The carpet has a pile height of 0.250 inch, 216 pitch of 8 rows per inch, a face weight of 49 lbs. per square yard, and a total weight of 79 lbs. per square yard.

A HMA is prepared by mixing equal parts by weight of a polyethylene base of 2,000–20,000 molecular weight, modified by terpene resins, sold by the Eastman Chemical Corp. under the trade name Eastobond L–8080–91 and a low viscosity, fast setting, non-alkali dispersible synthetic resin sold by the H. B. Fuller Co. under the trade name HM 065–R. The mixture is melted on a flat, heated plate coated with polytetrafluoroethylene layer sold by the Du Pont de Nemours & Company under the trade name Teflon. The melt is allowed to spread out to form a sheet substantially of $\frac{1}{16}$" thickness. After the melt cools and rigidifies, it is cut into 1¼" wide strips.

A seaming tape is prepared in accordance with the invention by interposing a strip of HMA made in accordance with the aformentioned process, between a sheet of kraft paper and an open mesh tape of 3" width made from glass fibers, the tape being sold by the Canso Corp. under the trade name Kloisette, Jr. A sadiron having a surface temperature of about 400° F. is briefly applied to the seaming tape for only a period sufficient to slightly melt the HMA whereby the kraft paper strip and the strip of seaming tape become bonded together. After cooling, the resulting tape is sufficiently flexible to be rolled up and the HMA does not crack upon sudden flexing. The weight of the HMA is 0.375 oz. per foot tape length.

A 5" long strip of the tape assembly prepared in accordance with the foregoing is placed onto a flat floor surface. The cut edges of the 5" wide strips of carpet are placed over the seaming tape assembly. Sufficient weight is placed outside the edge zones of the two strips of carpeting to be joined to prevent them from slippage and a change in their relative position.

The carpet edge zont of the strips to be joined are bent upward to make room for the insertion of a sadiron. An electrically heated, thin sadiron having a surface temperature of approximately 350–400° F. is placed between the separated carpet edges and into contact with the seaming tape. The separated carpet edge zones are then released and draped over the top of the sadiron, the handle of the sadiron protruding between the abutting edges. The sadiron is slowly pulled along the length of the seam, and the molten HMA can be observed to ooze upward between the interstices of the joining web. The progress of the sadiron is followed by the fingers of the operator pressing the abutting edge zones into the molten HMA. The entire operation is completed within less than 1½ minutes.

After an ample, i.e., about 5 minute cooling period the weights are removed from the joined carpet strips and the opposing outer ends of the joined strips are placed into opposingly disposed grip-jaws of a hydraulically powered ram. The ram is of the type capable of exerting pressure in opposing directions and also being provided with a pressure gauge reading in pounds per square inch. The joined strip is then placed under gradually increasing tension. Under a stretch registering 600 p.s.i. pressure on the gauge, the carpet backing begins to tear, indicating that the strength of the bond created is greater than the strength of the carpet itself.

As control, a similar 5" wide strip of carpet is cut and seamed in accordance with the prior art. A piece of kraft paper is superimposed with an open mesh tape made of glass fibers and being of 3" width, the same as used in the example above. An epoxy-base type carpet seaming adhesive sold by the Bigelow-Sanford Corp. under the trade name Lokweave Sealer is applied over the tape with a spreading knife having a serrated spreading edge for leaving only predetermined amounts of the sealing compound in ridged formation, as specified by the manufacturer of the sealing compound. The deposited layer becomes smooth by the composition flowing out and leveling over the tape. The abutting carpet edge zones are pressed into the sealing compound and stay tacks are driven through the carpet to hold the edge zones against the tape and against the seaming compound. While the normal drying period for the type of seaming compound is between 6-10 hours, in this instance the stretch test is carried out only after a 30 hour drying period. The stay tacks are removed after the first 8 hours. In a stretch test identical in every respect to the one described hereinabove the seam of this control test bursts at 400 p.s.i. tension, failure occurring in the adhesive joint between the seaming tape and the carpet backing in the edge zones, resulting in a clear separation of the carpet seam.

A control test similar to that above is carried out, this time using a latex adhesive sold by the Wayne Adhesive & Container Co. under the trade name Fabstic. Upon stretching, the seam starts to open up around 200 p.s.i. and separates at the adhesive joint at about 250 p.s.i stretch.

EXAMPLES 2-7

One sixteenth of an inch thick HMA slabs are cut into different widths of ⅛", ¼", and ½", weighing 0.0625, 0.125, and 0.25 oz. per foot of tape, respectively. Seams prepared with the above seaming tapes demonstrate a break strength of 65,250 and 500 p.s.i., respectively, indicating that the 0.0625 oz. per foot HMA weight is inadequate to duplicate the bond strength of the prior art latex seams.

Additional tests are caried out with 1/32" thick HMA layers of ¼", ½", and 1", widths weighing 0.0625, 0.125, and 0.25 oz. per foot of tape, respectively. The bond strength tests give results comparable to those obtained with the 1/16" thick HMA slabs.

Having described my invention, what I claim as new and desire to secure by Letters Patent is:

1. A process for making a carpet seaming tape which comprises uniting a hot-melt adhesive and a joining web having interstitial spaces to one side of a barrier web, the hot-melt adhesive being applied along a course, the marginal expanse of which is spaced inwardly from the margins of the barrier web, the amount of said hot-melt adhesive being sufficient to provide at least 0.12 oz. of said hot-melt adhesive per foot of tape length.

2. A process for making a carpet seaming tape according to claim 1 wherein the barrier web is paper.

3. A process for making a carpet seaming tape according to claim 1 wherein the amount of hot-melt adhesive used is sufficient to provide at least 0.4 oz. of said hot-melt adhesive per foot of tape length.

4. A process for making a carpet seaming tape according to claim 1 wherein said hot-melt adhesive is applied along a course, the marginal expanse of which is spaced inwardly from the margins of both said barrier web and said joining web.

5. A process for making a carpet seaming tape which comprises uniting a hot-melt adhesive and a joining web of open mesh tape including glass fibers to one side of a paper barrier web, the hot-melt adhesive being applied along a course the marginal expanse of which is spaced inwardly from the margins of both said barrier web and said joining web, sufficient hot-melt adhesive to provide at least 0.4 oz. of said hot-melt adhesive per foot of tape length being employed.

6. A process for making a carpet seaming tape according to claim 1 wherein said hot-melt adhesive is applied in the form of a layer at least 1/16" thick.

7. A process for making a carpet seaming tape according to claim 1 wherein said hot-melt adhesive is applied in the form of a layer at least 1/16" thick and weighs at least 0.4 oz. per foot of tape length.

8. A process for making a carpet seaming tape according to claim 1 wherein the joining web and hot-melt adhesive are united to said barrier web by stitching.

9. A process according to claim 8 wherein the amount of hot-melt adhesive used is sufficient to provide at least 0.4 oz. of hot-melt adhesive per foot of tape length.

10. A process for making a carpet seaming tape according to claim 1 wherein the joining web and hot-melt adhesive are united to said barrier web by clamping.

11. A process according to claim 10 wherein the amount of hot-melt adhesive used is sufficient to provide at least 0.4 oz. of hot-melt adhesive per foot of tape length.

12. A process for making a carpet seaming tape according to claim 1 wherein the joining web and hot-melt adhesive are united to said barrier web by stapling.

13. A process according to claim 12 wherein the amount of hot-melt adhesive used is sufficient to provide at least 0.4 oz. of hot-melt adhesive per foot of tape length.

14. A process for making a carpet seaming tape according to claim 1 wherein the hot-melt adhesive is applied in molten form and secures the joining web to the barrier web upon cooling.

15. A process according to claim 14 wherein the amount of hot-melt adhesive used is sufficient to provide at least 0.4 oz. of hot-melt adhesive per foot of tape length.

References Cited

UNITED STATES PATENTS

| | | | |
|---|---|---|---|
| 1,917,430 | 7/1933 | Clark | 161—50 |
| 2,147,772 | 2/1939 | Kallander | 117—68.5 |
| 2,408,756 | 10/1946 | Dow et al. | 161—65 |
| 3,234,061 | 2/1966 | Gardner | 156—93 |
| 3,362,862 | 1/1968 | King | 156—306 |

FOREIGN PATENTS

| | | | |
|---|---|---|---|
| 544,714 | 4/1942 | Great Britain | 156—306 |
| 720,083 | 10/1965 | Canada | 156—306 |

REUBEN EPSTEIN, Primary Examiner

U.S. Cl. X.R.

156—295, 306, 309

PO-1050
(5/69)

UNITED STATES PATENT OFFICE
CERTIFICATE OF CORRECTION

Patent No. 3,563,830          Dated February 16, 1971

Inventor(s) Charles D. Burgess

It is certified that error appears in the above-identified patent and that said Letters Patent are hereby corrected as shown below:

Column 1, line 26, after "hot", add -- -melt--.

Column 1, line 69, "The" (second occurrence) should read --the--.

Column 2, line 14, "insulation" should read --installat

Column 3, line 6, "alternately" should read --alternati

Column 6, line 66, "zont" should read --zone--.

Column 6, lines 50-51, delete ", the tape being sold by the Canso Corp. under the trade name Kloisette, Jr".

Column 7, line 21, "An epoxy-base type" should read --A

Signed and sealed this 6th day of June 1972.

(SEAL)
Attest:

EDWARD M. FLETCHER, JR.
Attesting Officer

ROBERT GOTTSCHALK
Commissioner of Patents